US008898784B1

(12) United States Patent  
Alexander et al.

(10) Patent No.: US 8,898,784 B1  
(45) Date of Patent: Nov. 25, 2014

(54) DEVICE FOR AND METHOD OF COMPUTER INTRUSION ANTICIPATION, DETECTION, AND REMEDIATION

(71) Applicants: Keith B. Alexander, Ft. Meade, MD (US); Patrick W. Dowd, Annapolis, MD (US); Robert L. Grossman, River Forest, IL (US)

(72) Inventors: Keith B. Alexander, Ft. Meade, MD (US); Patrick W. Dowd, Annapolis, MD (US); Robert L. Grossman, River Forest, IL (US)

(73) Assignee: The United States of America, as represented by the Director, National Security Agency, Washington, DC (US)

( * ) Notice: Subject to any disclaimer, the term of this patent is extended or adjusted under 35 U.S.C. 154(b) by 0 days.

(21) Appl. No.: 13/573,931

(22) Filed: May 29, 2013

(51) Int. Cl.  
G06F 12/14 (2006.01)  
G06F 15/16 (2006.01)  
H04L 29/06 (2006.01)

(52) U.S. Cl.  
CPC .................................... H04L 63/145 (2013.01)  
USPC .............................................. 726/23; 709/232

(58) Field of Classification Search  
CPC ......... H04L 63/14; H04L 63/16; H04L 63/20; H04L 63/1433; H04L 12/56; G06F 15/173  
USPC ............ 726/2, 23, 25, 26, 24, 27; 713/13, 15, 713/23; 709/232, 228, 238; 370/401, 229, 370/218  
See application file for complete search history.

(56) References Cited

U.S. PATENT DOCUMENTS

| 5,966,531 | A  | * | 10/1999 | Skeen et al. ................... 719/315 |
| 6,564,258 | B1 | * | 5/2003  | Uniacke ......................... 709/223 |
| 6,839,003 | B2 | * | 1/2005  | Soliman et al. ................. 341/50 |
| 7,263,290 | B2 | * | 8/2007  | Fortin et al. ...................... 398/58 |
| 7,506,050 | B2 | * | 3/2009  | Glasmann et al. ............. 709/224 |
| 7,665,097 | B2 |   | 2/2010  | Rodrigues et al. |
| 7,697,420 | B1 | * | 4/2010  | Garahi et al. .................. 370/229 |
| 7,895,452 | B2 | * | 2/2011  | Mir et al. ....................... 713/193 |
| 8,112,642 | B2 | * | 2/2012  | Bose et al. ..................... 713/300 |
| 8,261,355 | B2 |   | 9/2012  | Rayes et al. |
| 2003/0182437 | A1 | * | 9/2003  | Kobayashi et al. ............ 709/232 |
| 2004/0027259 | A1 | * | 2/2004  | Soliman et al. ................. 341/50 |
| 2004/0128397 | A1 | * | 7/2004  | Glasmann et al. ............. 709/232 |
| 2004/0264371 | A1 | * | 12/2004 | Chen ............................. 370/229 |
| 2005/0213608 | A1 | * | 9/2005  | Modi et al. .................... 370/468 |
| 2006/0101511 | A1 | * | 5/2006  | Faillenot et al. ................ 726/13 |
| 2007/0064617 | A1 | * | 3/2007  | Reves ........................... 370/252 |
| 2007/0198863 | A1 | * | 8/2007  | Bose et al. ..................... 713/300 |
| 2007/0253341 | A1 | * | 11/2007 | Atkinson et al. .............. 370/252 |
| 2008/0196104 | A1 | * | 8/2008  | Tuvell et al. ................... 726/24 |
| 2009/0049318 | A1 | * | 2/2009  | Bose et al. ..................... 713/320 |
| 2009/0067440 | A1 | * | 3/2009  | Chadda et al. ................. 370/401 |
| 2010/0138097 | A1 | * | 6/2010  | Ku et al. .......................... 701/27 |
| 2010/0205315 | A1 | * | 8/2010  | Xia ............................... 709/228 |
| 2011/0103394 | A1 |   | 5/2011  | Vogt et al. |
| 2011/0119390 | A1 |   | 5/2011  | Leech et al. |

(Continued)

*Primary Examiner* — Abu Sholeman

(57) ABSTRACT

Electronic network security by establishing a network topology, including multiple devices, where the network includes a command and control layer and a transport layer, where the command and control layer is changeable by the transport layer and vice versa. All phases of an intrusion attempt are monitored to anticipate an intrusion, prevent an intrusion, and remedy a successful intrusion. An assessment of the threat is made in multiple dimensions. The topology of the network may be changed in accordance with the threat assessment. In addition, computer traffic in the network and from the intrusion source may be modified or stopped to guard against an intrusion, prevent an intrusion, and remedy a successful intrusion. The command and control layer is changeable by the transport layer and vice versa.

12 Claims, 5 Drawing Sheets

(56) References Cited

U.S. PATENT DOCUMENTS

| | | |
|---|---|---|
| 2011/0270972 A1 | 11/2011 | Mukherjee et al. |
| 2012/0054528 A1* | 3/2012 | Bose et al. .................... 713/340 |
| 2012/0075988 A1* | 3/2012 | Lu et al. ........................ 370/218 |
| 2012/0123806 A1* | 5/2012 | Schumann et al. ............... 705/4 |
| 2012/0264371 A1* | 10/2012 | Kim ............................ 455/13.2 |
| 2013/0258946 A1* | 10/2013 | Yie et al. ....................... 370/328 |
| 2014/0136455 A1* | 5/2014 | Cheng ............................ 706/12 |

* cited by examiner

DEVICE FOR AND METHOD OF COMPUTER INTRUSION ANTICIPATION, DETECTION, AND REMEDIATION

FIELD OF THE INVENTION

The present invention relates, in general, to information security and, more particularly, to monitoring or scanning of software or data including attack prevention.

BACKGROUND OF THE INVENTION

Initially, relatively powerful computers were constructed as unique mainframes operated by larger corporations on isolated networks. Then, computers with modest amounts of computing power were made available to individuals as stand-alone personal computers. The computing power of personal computers and the applications for which they could be used were increased by networking them with other computers throughout the world using ancillary devices (e.g., servers, routers, links, switches, hubs, etc.). An arrangement into which computer and ancillary devices are configured is called a topology. There are many different types of topologies (e.g., bus, ring, star, tree, mesh, etc.).

Computers and networking devices were initially designed using mostly unique hardware, where software was mainly used to program applications that could operate, or "run," on the hardware. With the creation of virtual machines (i.e., software that emulates an operating system) and software-defined networking (i.e., software that emulates a network element such as a router), the control of a computer network may now be achieved mostly in software that runs on generic hardware. The benefits of such a network is ease of modification and improvement while avoiding a large investment in new unique hardware. However, with advantages often comes disadvantages.

Networking over a public network is less secure than an isolated network due to the accessibility of a network by a hacker (i.e., a person who improperly gains access to a computer network or information to cause some type of harm such as acquiring proprietary information, revealing proprietary information, erasing valuable information, modifying valuable information, etc.). Typically, a hacker inserts software ("malicious code" or "malware") into a computer network to not only provide incorrect data but to influence, or take control of, the command and control structure of the network.

Prior art intrusion detection systems monitor computer networks or systems for attempts to load malware onto a computer or violations of network security policies. Examples of malware include computer viruses, ransomware, worms, Trojan horses, rootkits, keyloggers, dialers, spyware, adware, malicious browser helper objects, and rogue security software. Three types of malware detection methods are currently being used: signature-based methods, anomaly-based methods, and protocol analysis methods.

Signature-based detection methods search for a bit pattern, or signature, that is known to be associated with malware. A shortcoming of such a method is that it is backward-looking. That is, a signature cannot be used to detect malware until after the malware has been used against a computer, the malware is manually identified as such, the malware is analyzed to determine a signature that may be used to electronically identify the malware, and an intrusion detection system is updated to be able to search for the signature. Until these activities are completed, the malware cannot be identified by a signature-based intrusion detection system. An intrusion attempt made before a signature is identified for it is commonly referred to as a "zero-day attack." It may take much time, if ever, to complete these tasks. Another shortcoming is that these activities must be done for each instance of malware. So, the amount of signature that should be searched approaches the amount of malware ever created.

Anomaly-based detection methods determine the average condition of malware-free computer traffic and search for sufficient deviations from the average. A shortcoming of such a method is that an average of computer traffic is a fiction that may not represent malware-free, or benign, computer traffic. Another shortcoming is that once the average is known, malware may be designed to avoid detection by use of the average.

Protocol-analysis-based detection methods determine profiles of perceived benign computer activity and search for sufficient deviations from the profiles. A shortcoming of such a method is that a profile of perceived benign computer activity is a fiction that may not represent benign computer traffic. Another shortcoming is that once the profiles are known, malware may be designed to avoid detection by use of the protocols.

Prior art intrusion detection systems have a very narrow view into intrusion attempts and are either backward-looking or use a fiction about average computer network traffic or benign computer activity. Therefore, there is a need for a computer security device and method that not only takes a wider view of intrusion detection but also addresses the issue of malware that has successfully avoided detection and is operating on a computer.

U.S. Pat. No. 7,665,097, entitled "ASSOCIATING NOTIFICATIONS OF THE STATUS OF A DATA NETWORK BY USE OF A TOPOLOGY EDITOR," discloses a user-controlled interface (i.e., a topology editor) to establish functional relationships (i.e. a topology) between devices on a data network. U.S. Pat. No. 7,665,097 is incorporated by reference into the specification of the present invention. U.S. Pat. No. 7,697,420, entitled "SYSTEM AND METHOD FOR LEVERAGING NETWORK TOPOLOGY FOR ENHANCED SECURITY," discloses a device for and method of establishing a variable communication path between a source node and a destination node, where the path is selected randomly to prevent any single node from participating in a sufficient number of transmission path so that a complete data packet or a series of data packets may not be intercepted from the node by an unintended recipient. U.S. Pat. No. 7,697,420 is incorporated by reference into the specification of the present invention.

U.S. Pat. No. 8,261,355, entitled "TOPOLOGY-AWARE ATTACK MITIGATION," discloses a device for and method of determining the topology of a network and deploying an intrusion prevention system in one or more of the devices in the network. U.S. Pat. No. 8,261,355 is incorporated by reference into the specification of the present invention.

U.S. Pat. Appl. Pub. No. 20110103394, entitled "NETWORK TOPOLOGY CONCEALMENT USING ADDRESS PERMUTAION," discloses a method of obfuscating a source IP address of a packet to be transmitted to conceal the location of the device that transmitted the packet. U.S. Pat. Appl. Pub. No. 20110103394 is incorporated by reference into the specification of the present invention.

U.S. Pat. Appl. Pub. No. 20110119390, entitled "SELECTIVELY RE-MAPPING A NETWORK TOPOLOGY," discloses a device for and method of selectively re-mapping a network topology based on information in a user profile. U.S. Pat. Appl. Pub. No. 20110119390 is incorporated by reference into the specification of the present invention.

U.S. Pat. Appl. Pub. No. 20110270972, entitled "VIRTUAL TOPOLOGY ADAPTATIONFOR RESOURCE OPTIMIZATION IN TELECOMMUNICATION NETWORKS," discloses a device for and a method of virtual topology adaptation for resource optimization. U.S. Pat. Appl. Pub. No. 20110270972 is incorporated by reference into the specification of the present invention.

SUMMARY OF THE INVENTION

It is an object of the present invention to anticipate intrusion attempts into an electronic network and protect the network accordingly.

It is another object of the present invention to detect malware that has intruded an electronic network and take remedial action to render the malware ineffective.

The present invention is a device for and method of electronic network security.

An electronic network topology is established, where the electronic network includes multiple devices, a command and control layer, and a transport layer, where the command and control layer is changeable by the transport layer and vice versa.

Threats to the electronic network are monitored in all phases of an intrusion.

An assessment of the threat to the electronic network is generated as a function of the result of the monitored threat in multiple dimensions.

Responses to a threat include changing topology of the network, either the transport topology or the command and control topology, modifying computer traffic associated with an intrusion attempt in the network or at the intrusion source, and stopping computer traffic in the network or at the intrusion source.

The command and control layer is changeable by the transport layer and vice versa.

DETAILED DESCRIPTION OF THE PREFERRED EMBODIMENT

The present invention is a device for and method of electronic network security that not only takes a wide view to anticipate an attempt to intrude a network but also identifies malware that had previously intruded, and is operating on, the network, and takes appropriate remedial action to render the malware ineffective. Prior art intrusion detection systems take a narrow view of intrusion detection by focusing on current network traffic in isolation and do not considering a broad range of information associated with an intrusion attempt over a longer period of time (e.g., days, weeks, months, years) and over other dimensions (e.g., space, intrusion-attempt choreography, type of intrusion actor, number of intrusion actors). In addition, prior art signature-based intrusion detection systems focus on present intrusion attempts and neglect to search for past, successful intrusions. Detecting functioning malware that previously intruded a network involves detecting different network traffic and computer activity than detecting an initial intrusion attempt. Once malware is detected, the present invention responds appropriately to render the malware ineffective. The present invention's contribution to computer security is analogous to radar's contribution to weather reporting (i.e., provide advanced information to be analyzed by experts to determine what, if any, protective action must be taken).

Figure 1:
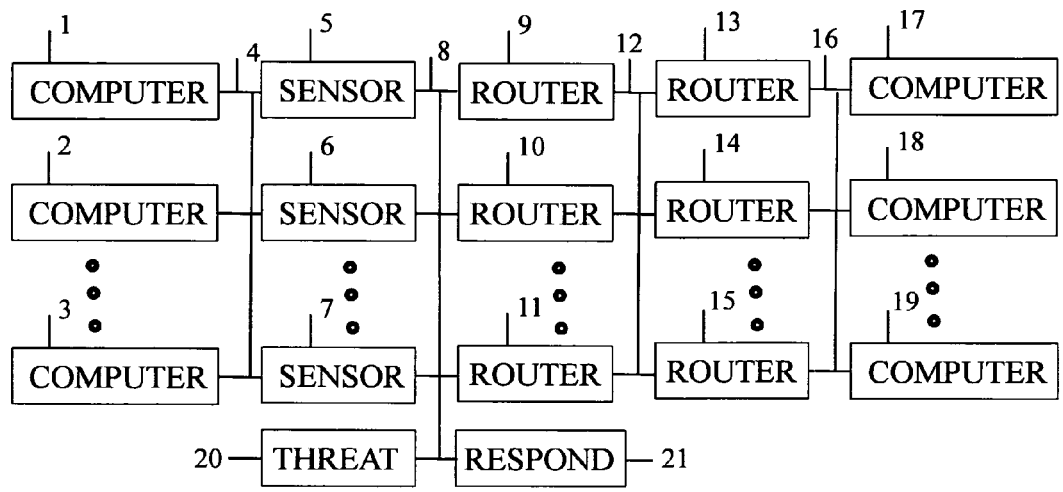
FIG. 1 is a schematic of an exemplary network space of the present invention.

FIG. 1 is a schematic of an exemplary network space of the present invention. It allows for maximal flexibility in connecting the components of the network into a user-definable and dynamically-configurable network topology. The network space includes a first set of computers 1, 2, 3 (e.g., workstations, laptop computers, tablet computers, or any other type of device that may be used to access a network, including mobile devices such as a smart phone and a personal digital assistant). The first set of computers 1,2, 3 may be realized in hardware, software (e.g., virtual machine), or a combination of both. The outputs 4 of the first set of computers 1, 2, 3 are connected in bus-like fashion to the inputs of sensors 5, 6, 7 that sense activities associated with the planning of an intrusion attempt, the execution of an intrusion attempt, and the operation of malware that previously intruded the network and provide information on which a multi-dimensioned real-time assessment of the network may be made.

An intrusion attempt does not just happen. Planning and preliminary computer-traffic activity that occurs prior to an actually intrusion attempt are involved. Prior art intrusion detection systems do not consider such preliminary activity as does the present invention and, therefore, cannot anticipate an intrusion attempt and muster adequate defenses as can the present invention.

Preliminary activities include but are not limited to a survey phase and a reconnaissance phase. The survey phase includes but is not limited to broadly cataloging a network to identify vulnerabilities in the network to exploit. Such network cataloging includes but is not limited to computer network traffic and activity associated with ping sweeps to map a network, host discovery, decrements of time-to-live (TTL) values as used in a trace-route to map paths between nodes, network route tables to infer a map of a network, and other possible techniques to discover and map a network. A survey technique may be passive or active, where "passive" means that computer traffic to and from a network is merely observed without interacting directly with the network, and where "active" means communicating, or interacting, with the network to elicit a response from the network to garner information about the network.

The reconnaissance phase includes but is not limited to a more detailed evaluation of the network to understand its internal characteristics (e.g., operating system, open ports, applications (apps) installed, listening services, role, location, ingress/egress points). Passive reconnaissance activities include characterizing a user system, a file server, and mail server. Active reconnaissance activities include characterizing an operating system.

An actual intrusion attempt follows the preliminary activity, where the time from the preliminary phase may vary (e.g., fractions of a second, seconds, minutes, hours, days, weeks, months, years). Prior art intrusion detection systems do not consider the time between a preliminary phase and an actual intrusion attempt as does the present invention.

An actual intrusion attempt involves a set of activities that are necessary for loading malware onto the intended network. For a prior art signature-based intrusion detection system to identify an actual intrusion attempt, a signature for detecting the intrusion attempt must be known, the signature must be installed on the intrusion detection system, and the system must be using the signature. A prior art signature-based intrusion detection system cannot detect a zero-day attack, whereas the present invention can.

If a network is successfully intruded then the malware may operate, where the activity of the malware may be very different than the activity involved in the preliminary and actual intrusion phases. Typically, malware receives instructions from a remote device on how it is to command and control the intruded network. Activities associated with successful intrusion include but are not limited to computer network traffic from a remote device instructing the malware and exfiltration of data from the network to a remote device.

Some malware may include another phase for which a network must protect itself. That is, a maintenance phase, where malware attempts to maintain its presence in the intruded network in the event of activity in the network that would normally render the malware ineffective (e.g., reboot, power cycle, installation or deletion of applications, update to the operating system, update to hardware). The activity of the malware may be very different than the activity involved in the preliminary, actual intrusion, and active malware phases. Activities associated with the maintenance phase include but are not limited to computer network traffic from within the network configuring the network differently that its configuration baseline.

The sensors 5, 6, 7 collect information from computer traffic in the network for the survey, reconnaissance, actual intrusion, active malware, and maintenance phases. Depending on the initiation of the present invention, the sensors 5, 6, 7 may collect information from all or some of these phases. The outputs 8 of the sensors 5, 6, 7 are connected in bus-like fashion to the inputs of a first set of routers 9, 10, 11. The outputs 12 of the first set of routers 9, 10, 11 are connected in bus-like fashion to the inputs of a second set of routers 13, 14, 15. The outputs 16 of the second set of routers 13, 14, 15 are connected in bus-like fashion to the inputs of a second set of computers 17, 18, 19, where the second set of computers 17, 18, 19 are selected from the same group of devices as the first set of computers 1, 2, 3. In the comparison of the present invention to radar used in weather reporting, the sensors 5, 6, 7 are equivalent to different radar stations positioned at different locations to collect data from their locations.

A threat-assessment function block 20 is connected in bus-like fashion to the outputs 8 of the sensors 5, 6, 7 and the inputs of the first set of routers 9, 10, 11. The threat-assessment function block 20 receives information collected by the sensors 5, 6, 7 and analyzes it in one or more user-definable combinations and permutations to anticipate an intrusion into the network, detect an actual attempt to intrude the network, and detect the operation of malware on the network. The threat-assessment function block 20 analyzes information received from the sensors 5, 6, 7 from different bases: temporal, spatial, and intrusion choreography. A temporal analysis involves correlating information received at different times to discern a pattern of computer network communication/activity that may constitute intrusion activity from any of the phases described above, where the information either matches a known intrusion attempt, the information matches a user-definable portion of a known intrusion attempt, the information does not match any known intrusion attempt but exhibits a significant number of user-definable characteristics that are deemed indicative of an intrusion attempt. By doing so, the present invention may identify a zero-day intrusion attempt, something that prior art signature-based intrusion detection systems are unable to do. Techniques employed by the threat-assessment function block 20 are selected from the group of techniques consisting of artificial intelligence techniques, neural network techniques, pattern-recognition techniques, decision-tree techniques, and any other suitable technique for drawing inferences from disparate information. After analyzing information received from the sensors 5, 6, 7, the threat-assessment function block 20 produces an assessment of the level of threat posed to the network. In the comparison of the present invention to radar used in weather reporting, the threat-assessment block 20 is equivalent to an expert that can analyze data collected by the sensors. The threat-assessment block 20 is analogous to a meteorologist and/or the U.S. Government's National Oceanic and Atmospheric Administration (NOAA).

A response function block 21 is connected in bus-like fashion to the output 8 of the threat-assessment block 20 and the input of the first set of routers 9, 10, 11 for responding appropriately to the threat assessed by the threat-assessment function block 20. Other numbers and types of devices may be included in a network space (e.g., servers, links, hubs, etc.). Based upon the assessment received from the threat-assessment function block 20, the response function block 21 determines the degree to which the topology of the network should be changed to render the threat ineffective (e.g., ignore the threat and leave the topology the same, initiate extended monitoring by increasing the amount and the level of monitoring, blocking computer traffic associated intrusion activity or the intrusion itself, change the topology that would render the threat ineffective and/or transmit computer traffic to change the computer traffic associated with the intrusion attempt to render it ineffective, cause the computer traffic associated with the intrusion attempt to not reach its target, transmit computer traffic to the source of the computer traffic associated with the intrusion attempt to terminate the intrusion attempt, and any other active method that would mitigate the threat in real time). In the comparison of the present invention to radar used in weather reporting, the response function block 21 is equivalent a meteorologist, NOAA, or an individual who determines what to do given the assessment of the situation.

Figure 2:
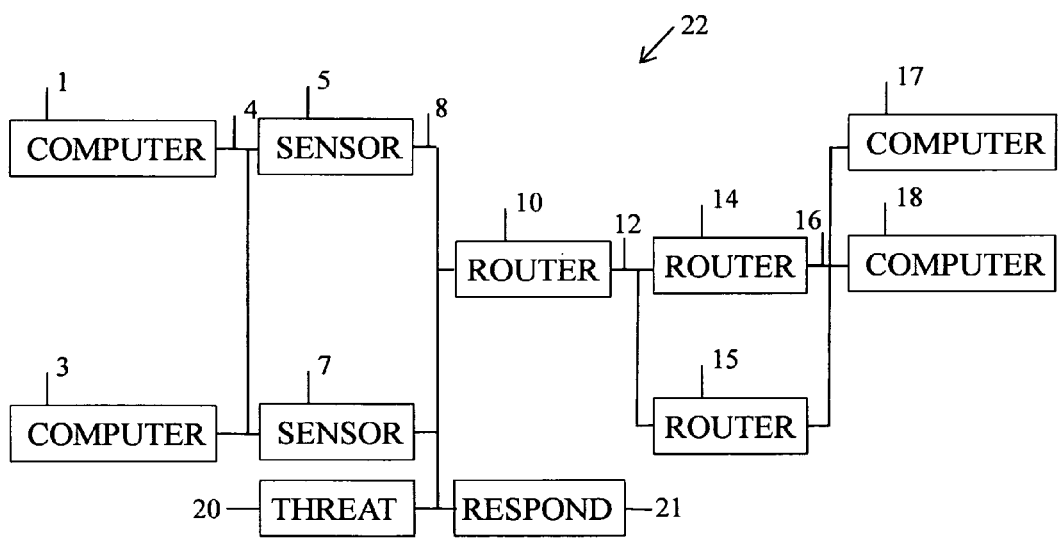
FIG. 2 is a schematic of an exemplary electronic network topology of the present invention.

FIG. 2 is a schematic of an exemplary electronic network topology 22 of the present invention. The topology 22 shown in FIG. 1 includes two of the first set of computers 1, 3, of FIG. 1. The outputs 4 of the two first set of computers 1, 3 are connected in bus-like fashion to two of the sensors 5, 7 of FIG. 1. The outputs 8 of the two sensors 5, 7 are connected in bus-like fashion to one of the first set of routers 10 of FIG. 1. The output 12 of the one of the first set of routers 10 is connected in bus-like fashion to two of the second set of routers 14, 15. The outputs 16 of the second set of routers 14, 15 are connected in bus-like fashion to two of the second set of computers 17, 18. Other user-definable overlay topologies in an electronic network space are possible, where the electronic network includes multiple physical devices, where the electronic network includes a command and control layer for controlling the electronic network, where the electronic network includes a transport layer for transporting electronic messages, where a message may be any type of electronic communication in any format (e.g., email, data, files, images, video, etc.) to and from the electronic network, and where the command and control layer is changeable by the transport layer and vice versa.

The electronic network topology 22 may be a hardware network, a software-defined network, a virtual-machine network, a mobile network, a distributed network, or any other possible electronic network. An electronic network topology 22 may include devices selected from the group of devices consisting of workstations, laptop computers, tablet computers, mobile computing devices, servers, routers, sensors, and any other electronic device that is usable within an electronic network.

The sensors 5, 6, 7 of FIG. 2 monitor network computer traffic to and from, and computer activity within, the electronic network topology 22 to collect information associated with each of the intrusion phases described above. The information collected the sensors 5, 6, 7 is identified in accordance with the different dimensions by which the information will be analyzed (e.g., time, space, intrusion choreography, type of intrusion actor, number of intrusion actors).

The threat-assessment function block 20 is connected to the outputs 8 of the sensors 5, 6, 7 and the inputs of the first set of routers 9, 10, 11. The threat-assessment function block 20, implemented in a centralized or distributed manner, receives input from the sensors 5, 6, 7 and analyzes it in user-definable combinations and permutation in different dimensions (e.g., time, space, intrusion choreography, type of intrusion actor, number of intrusion actors) to determine a level of threat to the electronic network. The threat-assessment function block 20 assigns a user-definable label to each improper attempt to access the electronic network. Improper attempts to access the electronic network are aggregated, correlated, and associated across the electronic network, where each class of improper attempt to access the electronic network is weighted in a user-definable manner. Any number of threat-assessment function blocks 20 may be used at any user-definable location in the electronic network topology 22. An appropriate response to the perceived threat is them determined (e.g., leave the topology of the network the same, change the topology of the network to a user-definable degree, and disrupt the computer traffic and/or the source of the computer traffic associated with the intrusion attempt).

The response function block 21 connected in bus-like fashion to the output 8 of the threat-assessment block 20 and the input of the first set of routers 9, 10, 11 changes the topology of the electronic network in accordance with the threat assessment made by the threat-assessment function block 20. In addition to changing the topology of the network, the command and control layer of the network may be changed by the transport layer associated with the topology and vice versa. This type of response action allows for the dynamic reconfiguration of the command and control topology and/or the transport topology to address the level of perceived threat to the network.

Figure 3:
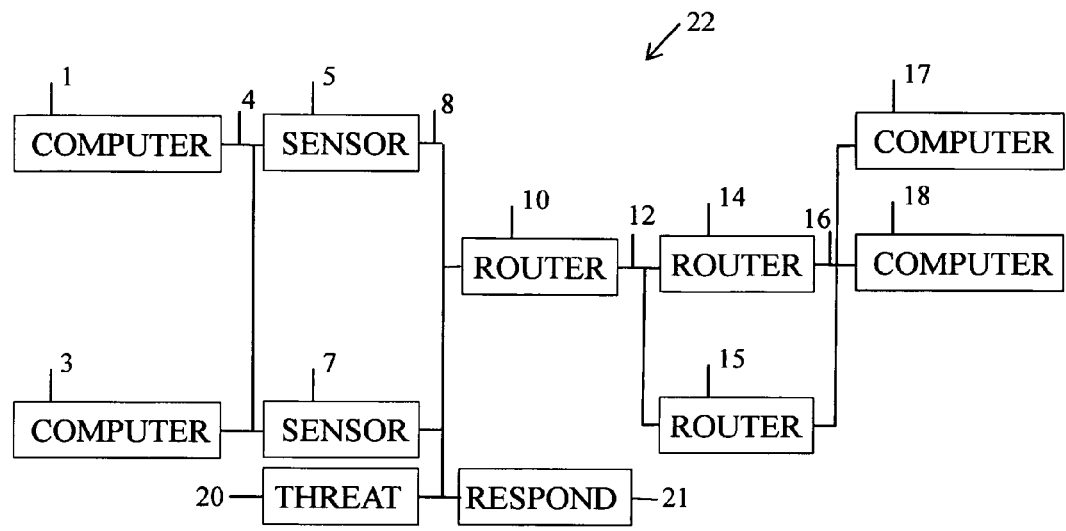
FIG. 3 is a schematic of an exemplary transport layer for FIG. 2.

FIG. 3 is a schematic of an exemplary transport layer for FIG. 2. In this example, the transport layer is identical to the electronic layer topology 22 of FIG. 1. However, a transport layer of a network may differ from the topology of the network.

Figure 4:
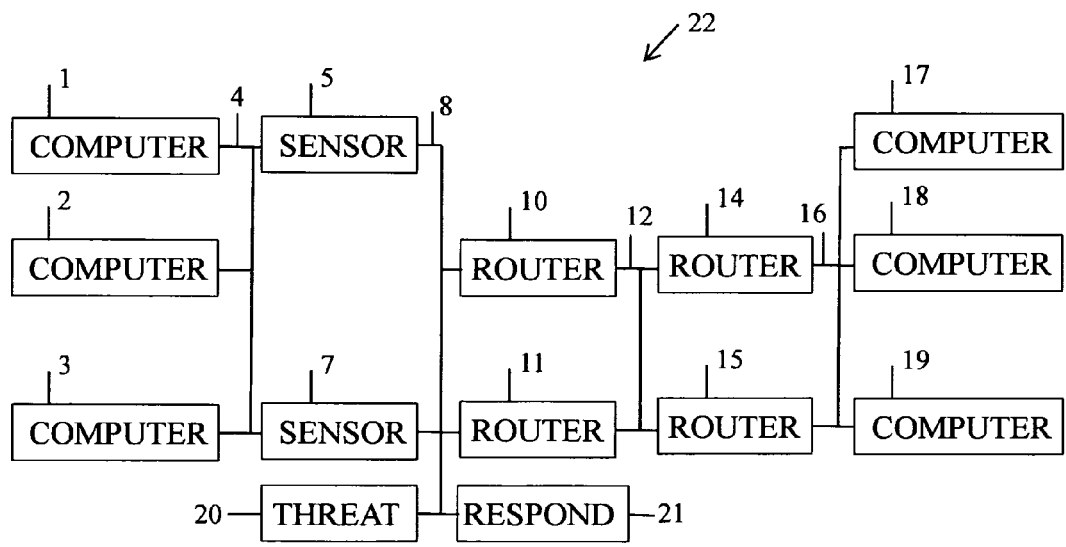
FIG. 4 is a schematic of an exemplary command and control layer for FIG. 2.

FIG. 4 is a schematic of an exemplary command and control layer for FIG. 2. It includes all of the components of FIG. 3 in the same arrangement. It also includes three other components from FIG. 1 (i.e., the second computer 2 from the first set of computers, the third router 11 from the first set of routers, and the third computer 19 from the second set of computers.

Figure 5:
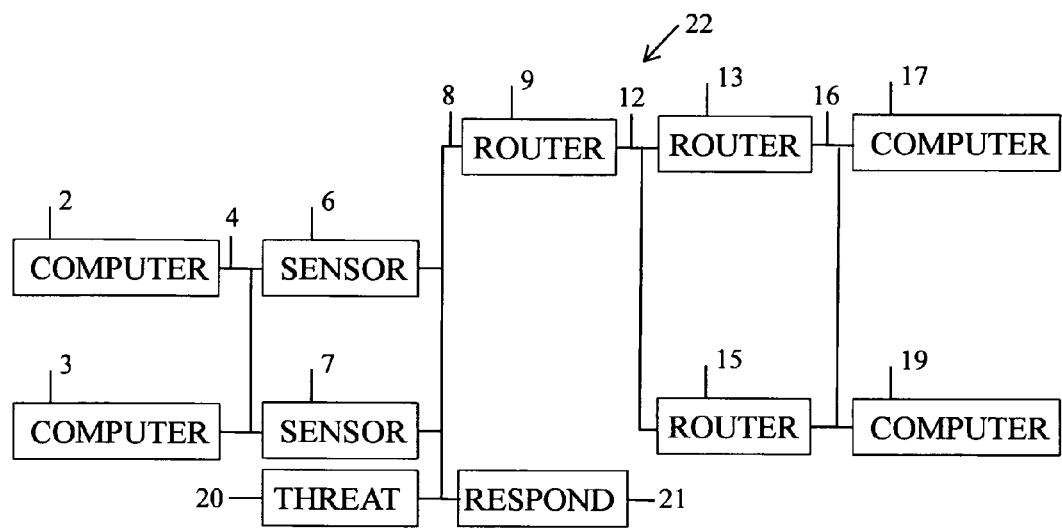
FIG. 5 is a schematic of the electronic network of FIG. 2 after it has been changed in response to a detected threat to the electronic network.

FIG. 5 is a schematic of the electronic network of FIG. 2 after it has been changed in response to a perceived threat to the electronic network topology 22. That is, the first computer 1 in the first set of computers, the first sensor 5, the second router 10 in the first set of routers, the first router 13 in the first set of routers, and the second computer 18 in the second set of computers have been removed. In addition, the second computer 2 from the first set of computers, the second sensor 6, the second router in the first set of routers, the first router 13 in the second set of routers, and the third computer 19 in the second set of computers has been added.

Figure 6:
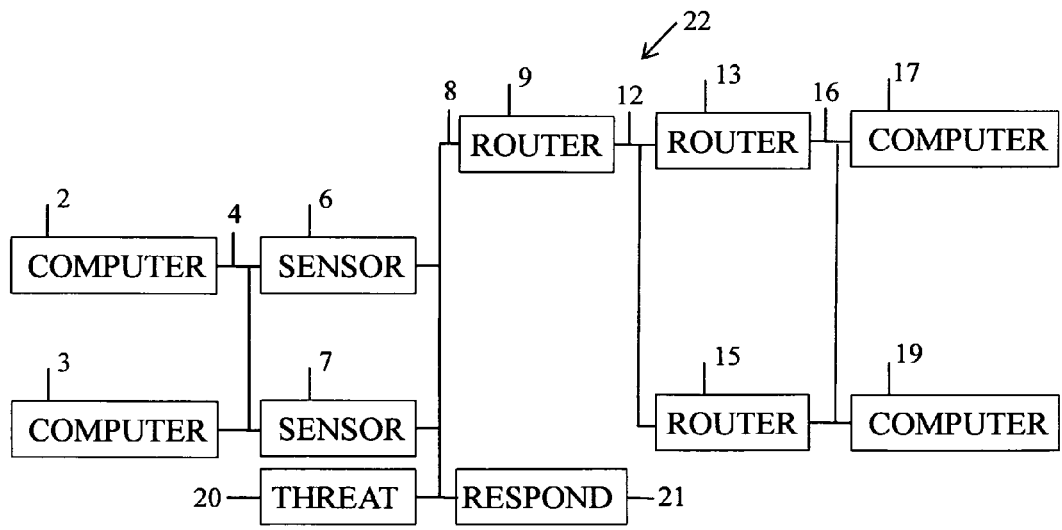
FIG. 6 is a schematic of the transport layer of FIG. 2 after it has been changed by the command and control layer in response to a detected threat to the electronic network.

FIG. 6 is a schematic of the transport layer of FIG. 2 after it has been changed by the command and control layer in response to a detected threat to the electronic network topology 22. It is changed in the same manner as the electronic network topology 22 as in FIG. 5. However, it could be different from the changed topology 22.

Figure 7:
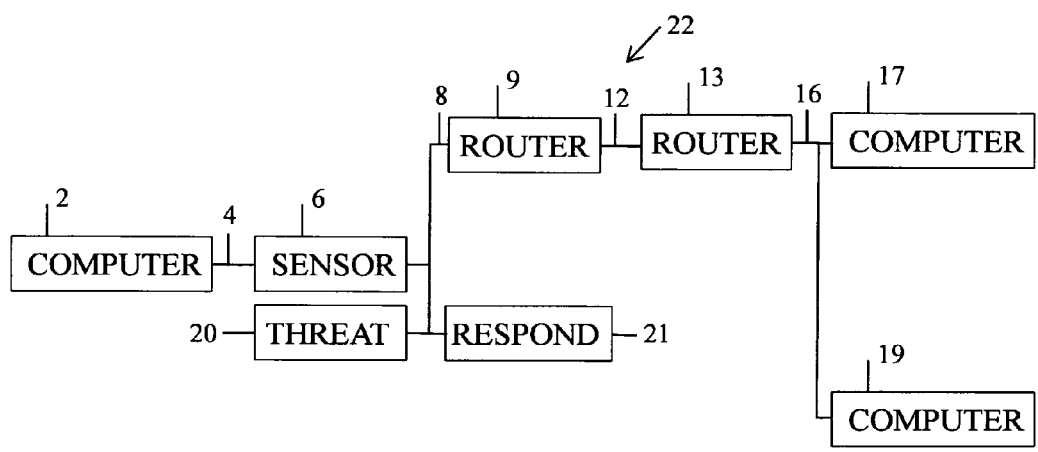
FIG. 7 is a schematic of the command and control layer of FIG. 2 after it has been changed by the transport layer in response to a detected threat to the electronic network.

FIG. 7 is a schematic of the command and control layer of FIG. 2 after it has been changed by the transport layer in response to a detected threat to the electronic network topology 22. It differs from the initial command and control layer of FIG. 4 as follows. The first and second computers 1, 2 in the first set of computers, the first sensor 5, the second and third routers 10, 11 in the first set of routers, the second and third routers 14, 15 in the second set of routers, and the second computer 18 in the second set of computers were removed. In addition, and the first router 9 in the first set of routers, the first router 13 in the second set of routers were added.

Figure 8:
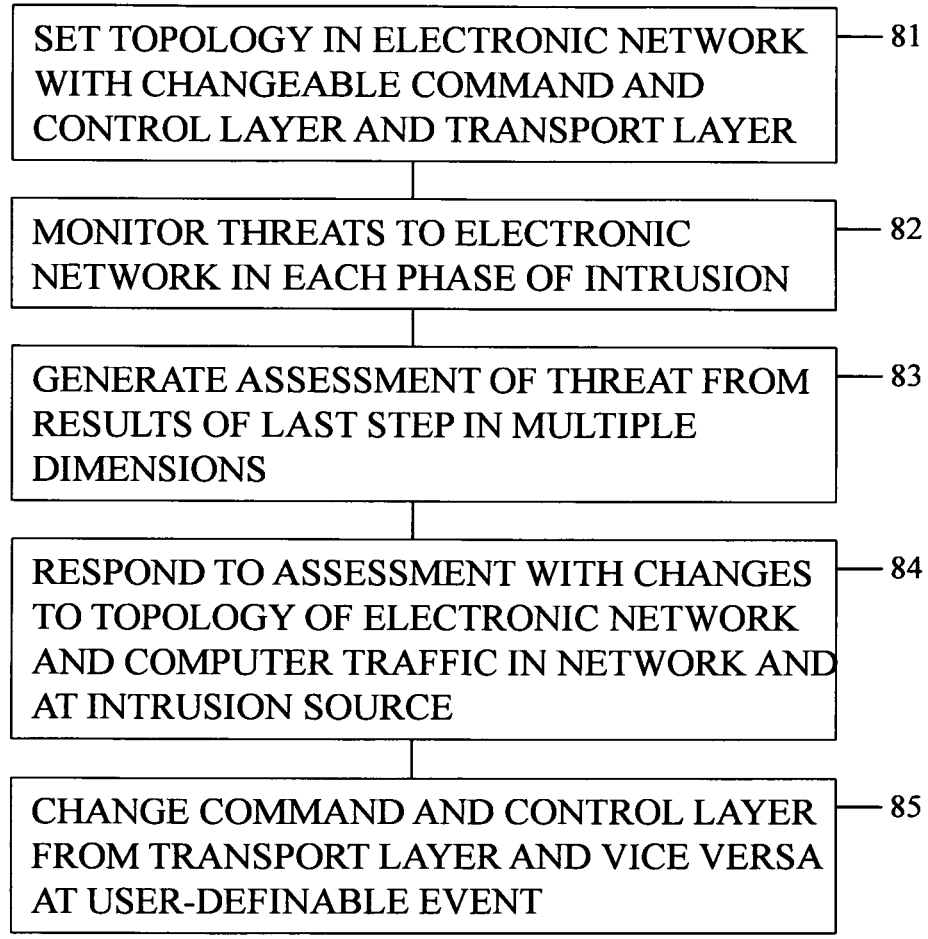
FIG. 8 is list of steps of the method of the present invention.

FIG. 8 is a list of steps of the method of the present invention.

The first step 81 of the method is establishing a topology in an electronic network, where the electronic network includes multiple devices, a command and control layer for controlling the network, and a transport layer for transporting electronic messages to and from the electronic network. The command and control layer is changeable by the transport layer and vice versa. The electronic network is selected from the group of electronic networks consisting of a hardware network, a software-defined network, a virtual machine network, a mobile network, and a distributed network. The electronic network includes devices selected from the group of devices consisting of workstations, laptop computers, tablet computers, mobile computing devices, servers, routers, and sensors.

The second step 82 of the method is monitoring computer traffic in, and computer activity within, the electronic network and collecting information associated with the different intrusion phases described above.

The third step 83 of the method is analyzing the information collected in the second step 82 to generate an assessment of the perceived threat to the electronic network in a user-definable number of permutation and combination of the different intrusion phases and in a user-definable number of different dimensions (e.g., time, space, intrusion choreography, type of intrusion actor, number of intrusion actors). The third step 83 assigns a user-definable number to each improper attempt to access the electronic network, where each class of improper attempt to access the electronic network is weighted in a user-definable manner. The numeric assessment is performed on the multi-dimensional threat monitored over time, space (e.g., on which device a communication was received, from what location a communication was sent), and the intrusion choreography for each aspect of an access attempt (e.g., survey, reconnaissance, intrusion attempt, malware operation, maintenance). The third step 83 determines levels of threat including attempts to improperly access the electronic network in a user-definable period of time, a user-definable spatial location within the electronic network, a user-definable sequence of events (i.e., intrusion choreography), and by one or more entities alone or in concert.

The fourth step 84 of the method is responding to the perceived threat assessed in the third step 83, where the response is selected from the group of responses consisting of leaving the topology of the network unchanged, changing the topology of the network to a degree commensurate with the level of perceived threat assessed in the third step 83, modifying the computer traffic associated with an intrusion attempt, modifying the computer traffic associated with functioning malware, stopping computer traffic associated with an intrusion attempt within the network, stopping computer traffic associated with an intrusion attempt at its source, and any combination thereof.

The fifth step 85 of the method is responding to the perceived threat assessed in the third step 83, where the response is selected from the group of responses consisting of leaving the command and control layer of the network unchanged, changing the command and control layer by the transport layer to a degree commensurate with the level of perceived threat assessed in the third step 83, changing the transport layer by the command and control layer to a degree commensurate with the level of perceived threat assessed in the third step 83, and any combination thereof. The fifth step 85 is an alternate embodiment of the present invention, whereas the preferred embodiment includes only the first four steps 81-84.

The present invention anticipate intrusion attempts to a computer network and protects the network accordingly, detects actual attempts at intruding the network, detects functioning malware that resulted from a successful intrusion, and responds accordingly to protect the network by changing its topology, counters computer traffic associated with the various phases of intrusion described above, and counters the source of computer traffic associated with the various intrusion phases.

What is claimed is:

1. An electronic network, comprising:
   a) an electronic hardware network in a user-definable topology, where the electronic network includes multiple devices, where the electronic network includes a command and control layer for controlling the electronic network, where the electronic network includes a transport layer for transporting electronic messages to and from the electronic network, and where the command and control layer is changeable by the transport layer and vice versa;
   b) a user-definable number of electronic hardware sensors for collecting computer traffic associated with phases of intrusion activity, where the phases are selected from the group of phases consisting of survey phase, reconnaissance phase, actual intrusion attempt phase, operating malware phase, maintenance phase and any combination of survey, reconnaissance, actual intrusion attempt, operating malware and maintenance phases;
   c) a threat-assessment function block embodied in a computing device and connected to the user-definable sensors and producing an assessment of the threat to the electronic network by analyzing information collected by the sensors in user-definable combinations and permutations over a user-definable number of dimensions selected from the group of dimensions consisting of time, space, intrusion choreography, type of intrusion actor, number of intrusion actors, and any combination of time, space, intrusion choreography, type of intrusion actor and number of intrusion actors; and
   d) a response function block embodied in a computing device and connected to the threat-assessment block for responding to the threat assessed by the threat-assessment function block, where the response is selected from the group of responses consisting of leaving the topology of the network unchanged, changing the topology of the network to a degree commensurate with the level of perceived threat assessed, modifying the computer traffic associated with an intrusion attempt, modifying the computer traffic associated with functioning malware, stopping computer traffic associated with an intrusion attempt within the network, stopping computer traffic associated with an intrusion attempt at a source of the computer traffic associated with the intrusion attempt, and any combination of leaving the topology of the network unchanged, changing the topology of the network to a degree commensurate with the level of perceived threat assessed, modifying the computer traffic associated with an intrusion attempt, modifying the computer traffic associated with functioning malware, stopping computer traffic associated with an intrusion attempt within the network and stopping computer traffic associated with an intrusion attempt at a source of the computer traffic associated with the intrusion attempt.

2. The electronic network of claim 1, wherein the electronic network is comprised of an electronic network selected from the group of electronic networks consisting of a hardware network, a software-defined network, a virtual-machine network, a mobile network, and a distributed network.

3. The electronic network of claim 1, wherein the electronic network includes devices selected from the group of devices consisting of workstations, laptop computers, tablet computers, mobile computing devices, servers, routers, and sensors.

4. The electronic network of claim 2, wherein the electronic network includes devices selected from the group of devices consisting of workstations, laptop computers, tablet computers, mobile computing devices, servers, routers, and sensors.

5. A method of electronic network security, comprising the steps of:
   a) establishing a topology in an electronic network, where the electronic network includes multiple devices, where the electronic network includes a command and control layer for controlling the network, where the electronic network includes a transport layer for transporting electronic messages to and from the electronic network, and where the command and control layer is changeable by the transport layer and vice versa;
   b) monitoring computer traffic to collect information associated with intrusion phases, where the intrusion phases are selected from the group of intrusion phases consisting of survey phase, reconnaissance phase, actual intrusion attempt phase, malware operation phase, and maintenance phase;
   c) generating an assessment of the threat to the electronic network by analyzing information collected in step (b) in user-definable combinations and permutations over user-definable dimensions selected from the group of dimensions consisting of time, space, intrusion choreography, type of intrusion actor, number of intrusion actors, and any combination of time, space, intrusion choreography, type of intrusion actor and number of intrusion actors; and d) responding to the threat assessed in step (c), where the response is selected from the group of responses consisting of leaving the topology of the network unchanged, changing the topology of the network to a degree commensurate with the threat assessment, modifying the computer traffic associated with an intrusion attempt, modifying the computer traffic associated with functioning malware, stopping computer traffic associated with an intrusion attempt within the network, stopping computer traffic associated with an intrusion attempt at a source of the computer traffic associated with the intrusion attempt, and any combination of leaving the topology of the network unchanged, changing the topology of the network to a degree commensurate with the threat assessment, modifying the computer traffic associated with an intrusion attempt, modifying the computer traffic associated with functioning malware, stopping computer traffic associated with an intrusion attempt within the network and stopping computer traffic associated with an intrusion attempt at a source of the computer traffic associated with the intrusion attempt.

6. The method of claim 5, wherein the step of establishing a topology in an electronic network is comprised of establishing a topology in an electronic network, where the electronic network is selected from the group of electronic networks consisting of a hardware network, a software-defined network, a virtual machine network, a mobile network, and a distributed network.

7. The method of claim 5, wherein the step of establishing a topology in an electronic network is comprised of establishing a topology in an electronic network, where the electronic network includes devices selected from the group of devices consisting of workstations, laptop computers, tablet computers, mobile computing devices, servers, routers, and sensors.

8. The method of claim 5, wherein said step of responding to the threat assessed in step (c) is further comprised of changing the command and control layer by the transport layer.

9. The method of claim 5, wherein said step of responding to the threat assessed in step (c) is further comprised of changing the transport layer by the command and control layer.

10. The method of claim 6, wherein the step of establishing a topology in an electronic network is comprised of establishing a topology in an electronic network, where the electronic network includes devices selected from the group of devices consisting of workstations, laptop computers, tablet computers, mobile computing devices, servers, routers, and sensors.

11. The method of claim 10, wherein said step of responding to the threat assessed in step (c) is further comprised of changing the command and control layer by the transport layer.

12. The method of claim 11, wherein said step of responding to the threat assessed in step (c) is further comprised of changing the transport layer by the command and control layer.

* * * * *